US010267652B1

(12) United States Patent
Magley et al.

(10) Patent No.: US 10,267,652 B1
(45) Date of Patent: Apr. 23, 2019

(54) NODE COMMUNICATION WITH UNKNOWN NETWORK ID (71) Applicant: Mueller International, LLC, Atlanta, GA (US)

(72) Inventors: Dale McLeod Magley, Norton, MA (US); Edward J. Meaney, Jr., Bridgewater, MA (US); David Edwin Splitz, Sandwich, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/877,548

(22) Filed: Jan. 23, 2018

(51) Int. Cl.
| | |
|---|---|
| G01D 4/00 | (2006.01) |
| H04W 76/11 | (2018.01) |
| H04W 76/14 | (2018.01) |
| H04L 12/751 | (2013.01) |
| G06Q 50/06 | (2012.01) |
| H04W 84/18 | (2009.01) |
| H04Q 9/04 | (2006.01) |

(52) U.S. Cl.
CPC .............. *G01D 4/006* (2013.01); *G01D 4/002* (2013.01); *G01D 4/004* (2013.01); *G01D 4/008* (2013.01); *H04L 45/026* (2013.01); *H04W 76/11* (2018.02); *H04W 76/14* (2018.02); *G06Q 50/06* (2013.01); *H04Q 9/04* (2013.01); *H04Q 2209/50* (2013.01); *H04Q 2209/60* (2013.01); *H04W 84/18* (2013.01)

(58) Field of Classification Search
USPC ....................................... 340/870.02–870.03
See application file for complete search history.

(56) References Cited

U.S. PATENT DOCUMENTS

| | | | |
|---|---|---|---|
| 5,371,734 | A | 12/1994 | Fischer |
| 5,438,329 | A | 8/1995 | Gastouniotis et al. |
| 5,594,776 | A | 1/1997 | Dent |
| 5,666,655 | A | 9/1997 | Ishikawa et al. |
| 5,774,733 | A | 6/1998 | Nolan et al. |
| 5,787,358 | A | 7/1998 | Takahashi |
| 5,892,441 | A | 4/1999 | Woolley et al. |

(Continued)

FOREIGN PATENT DOCUMENTS

| | | |
|---|---|---|
| EP | 2772074 | 8/2018 |
| WO | 2009133237 | 11/2009 |

(Continued)

OTHER PUBLICATIONS

Splitz, David Edwin; Office Action for Canadian application No. 2,861,675, filed Mar. 25, 2014, dated Apr. 12, 2018, 4 pgs.

(Continued)

*Primary Examiner* — Leon Viet Q Nguyen
(74) *Attorney, Agent, or Firm* — Taylor English Duma LLP (57) ABSTRACT

A method includes sending, by a node, a beacon at a regular time interval, the beacon comprising at least an associated utility device identification (ID) and communication channel information; receiving, at the node, a message from a network device on the communication channel beginning within a time window after a defined delay after the beacon was sent; determining, by the node, if the message comprises the associated utility device ID; and initiating, by the node, temporary two-way communication by sending a response to the network device.

14 Claims, 5 Drawing Sheets

(56) References Cited

U.S. PATENT DOCUMENTS

| | | |
|---|---|---|
| 5,963,557 A | 10/1999 | Eng |
| 6,028,855 A | 2/2000 | Hirsch |
| 6,031,466 A | 2/2000 | Leshets et al. |
| 6,405,047 B1 | 6/2002 | Moon |
| 6,717,926 B1 | 4/2004 | Deboille et al. |
| 6,900,737 B1 | 5/2005 | Ardalan |
| 7,123,628 B1 | 10/2006 | Hwang |
| 7,272,635 B1 | 9/2007 | Longtin et al. |
| 7,313,164 B1 | 12/2007 | Wilson et al. |
| 7,346,030 B2 | 3/2008 | Cornwall |
| 7,420,942 B2 | 9/2008 | Wang |
| 7,564,826 B2 | 7/2009 | Sherman et al. |
| 7,760,703 B2 | 7/2010 | Kubler et al. |
| 7,843,379 B2 | 11/2010 | Menzer et al. |
| 7,962,101 B2 | 6/2011 | Vaswani et al. |
| 8,014,791 B2 | 9/2011 | Guigne et al. |
| 8,194,636 B1 | 6/2012 | Doherty et al. |
| 8,300,626 B2 | 10/2012 | Thubert et al. |
| 8,375,134 B2 | 2/2013 | Herzog |
| 8,391,177 B2 | 3/2013 | Picard |
| 8,660,134 B2 | 2/2014 | Splitz |
| 8,855,569 B2 | 10/2014 | Splitz |
| 9,179,502 B2 | 11/2015 | Fischer |
| 9,204,341 B2 | 12/2015 | Su |
| 9,271,231 B2 | 2/2016 | Nucci |
| 9,408,112 B2 | 8/2016 | Su |
| 9,565,620 B2 | 2/2017 | Dukes |
| 9,743,458 B2 | 8/2017 | Jain et al. |
| 9,756,089 B2 | 9/2017 | Brook |
| 9,807,793 B2 | 10/2017 | Fischer |
| 9,854,607 B1 | 12/2017 | Chu et al. |
| 9,883,548 B2 | 1/2018 | Backholm et al. |
| 9,961,694 B2 | 5/2018 | Gao et al. |
| 10,039,018 B2 | 7/2018 | Splitz et al. |
| 10,070,403 B2 | 9/2018 | Grady et al. |
| 10,097,411 B2 | 10/2018 | Splitz et al. |
| 10,178,617 B2 | 1/2019 | Splitz et al. |
| 10,200,947 B2 | 2/2019 | Splitz |
| 2002/0051546 A1 | 5/2002 | Bizjak |
| 2002/0159434 A1 | 10/2002 | Gosior et al. |
| 2005/0078631 A1 | 4/2005 | Cornwall |
| 2005/0190784 A1 | 9/2005 | Stine |
| 2005/0249170 A1 | 11/2005 | Salokannel et al. |
| 2006/0187866 A1 | 8/2006 | Werb |
| 2006/0245440 A1 | 11/2006 | Mizukoshi |
| 2006/0268746 A1 | 11/2006 | Wijting et al. |
| 2006/0274673 A1 | 12/2006 | Fleury |
| 2007/0014269 A1 | 1/2007 | Sherman et al. |
| 2007/0057812 A1* | 3/2007 | Cornwall ............ H04Q 9/00 340/870.02 |
| 2007/0091825 A1 | 4/2007 | Budampati et al. |
| 2007/0286136 A1 | 12/2007 | Rittle et al. |
| 2007/0293221 A1 | 12/2007 | Hwang et al. |
| 2008/0043637 A1 | 2/2008 | Rahman |
| 2008/0086560 A1 | 4/2008 | Monier et al. |
| 2008/0240078 A1 | 10/2008 | Thubert |
| 2009/0201169 A1 | 8/2009 | D'Hont et al. |
| 2009/0268652 A1 | 10/2009 | Kneckt et al. |
| 2010/0007521 A1 | 1/2010 | Cornwall |
| 2010/0026517 A1* | 2/2010 | Cumeralto ............ G01D 4/006 340/870.03 |
| 2010/0085954 A1 | 4/2010 | Keshavarzian |
| 2010/0097988 A1 | 4/2010 | Chung |
| 2010/0195552 A1 | 8/2010 | Ho |
| 2010/0329232 A1 | 12/2010 | Tubb et al. |
| 2011/0018762 A1 | 1/2011 | Walley et al. |
| 2011/0066297 A1 | 3/2011 | Saberi |
| 2011/0140909 A1 | 6/2011 | Olson et al. |
| 2011/0152970 A1 | 6/2011 | Jollota |
| 2011/0317019 A1 | 12/2011 | Bahl et al. |
| 2012/0008536 A1 | 1/2012 | Tervahauta et al. |
| 2012/0026007 A1 | 2/2012 | Beattie |
| 2012/0115518 A1 | 5/2012 | Zeira |
| 2012/0201231 A1 | 8/2012 | Omeni |
| 2013/0007231 A1 | 1/2013 | Forssell |
| 2013/0064159 A1 | 3/2013 | Edwards |
| 2013/0083722 A1 | 4/2013 | Bhargava et al. |
| 2013/0094537 A1 | 4/2013 | Hui et al. |
| 2013/0107772 A1 | 5/2013 | Splitz et al. |
| 2013/0107999 A1 | 5/2013 | Mainaud et al. |
| 2013/0109319 A1 | 5/2013 | Splitz et al. |
| 2013/0155925 A1 | 6/2013 | Priyantha et al. |
| 2013/0181848 A1 | 7/2013 | Picard |
| 2013/0285855 A1 | 10/2013 | Dupray |
| 2013/0336245 A1 | 12/2013 | Fischer |
| 2014/0120962 A1 | 5/2014 | Merlin |
| 2014/0314003 A1 | 10/2014 | Zhou |
| 2014/0329498 A1 | 11/2014 | Cherian et al. |
| 2015/0003227 A1 | 1/2015 | Splitz |
| 2015/0006633 A1 | 1/2015 | Vandwalle et al. |
| 2015/0081814 A1 | 3/2015 | Turakhia |
| 2015/0103818 A1 | 4/2015 | Kuhn |
| 2015/0124698 A1 | 5/2015 | Jain et al. |
| 2015/0257041 A1 | 9/2015 | Su |
| 2015/0382283 A1 | 12/2015 | Wang et al. |
| 2016/0050689 A1 | 2/2016 | Fischer |
| 2016/0066249 A1 | 3/2016 | Dukes |
| 2016/0080980 A1 | 3/2016 | Su |
| 2016/0192381 A1 | 6/2016 | Gao et al. |
| 2016/0249378 A1 | 8/2016 | Zhou |
| 2016/0269971 A1 | 9/2016 | Kim et al. |
| 2016/0373940 A1 | 12/2016 | Splitz |
| 2017/0164307 A1 | 6/2017 | Zuniga et al. |
| 2017/0265153 A1 | 9/2017 | Grady et al. |
| 2017/0280450 A1 | 9/2017 | Jeong et al. |
| 2017/0303103 A1 | 10/2017 | Cullinan |
| 2017/0339016 A1 | 11/2017 | Splitz |
| 2018/0014248 A1 | 1/2018 | Splitz |
| 2018/0220354 A1 | 8/2018 | Heil |
| 2018/0310265 A1 | 10/2018 | Grady et al. |
| 2018/0317169 A1 | 11/2018 | Splitz et al. |
| 2019/0014393 A1 | 1/2019 | Splitz et al. |

FOREIGN PATENT DOCUMENTS

| | | |
|---|---|---|
| WO | 2013062571 | 5/2013 |
| WO | 2013062613 | 5/2013 |
| WO | 2016036475 | 3/2016 |
| WO | 2018203922 | 11/2018 |

OTHER PUBLICATIONS

Splitz, David Edwin; Notice of Allowance for U.S. Appl. No. 15/161,448, filed May 23, 2016, dated May 23, 2018, 16 pgs.

Splitz, David Edwin; Notice of Allowance for U.S. Appl. No. 14/490,081, filed Sep. 18, 2014, dated Mar. 2, 2018, 26 pgs.

Cullinan, Thomas; Non-Final Office Action for U.S. Appl. No. 15/098,986, filed Apr. 14, 2016, dated Jan. 5, 2018, 11 pgs.

Grady, Robert Henry; Notice of Allowance for U.S. Appl. No. 15/065,423, filed Mar. 9, 2016, dated Apr. 12, 2018, 15 pgs.

Splitz, David Edwin; Office Action for Canadian patent application No. 2,850,059, filed Mar. 25, 2014, dated Apr. 23, 2018, 3 pgs.

Splitz, David Edwin; Final Office Action for U.S. Appl. No. 15/161,448, filed May 23, 2016, dated Mar. 15, 2018, 16 pgs.

Splitz, David Edwin; Non-Final Office Action for U.S. Appl. No. 15/583,263, filed May 1, 2017, dated Mar. 8, 2018, 51 pgs.

Splitz, David Edwin; Issue Notification for U.S. Appl. No. 13/283,526, filed Oct. 27, 2011, dated Feb. 5, 2014, 1 pg.

Splitz, David Edwin; Non-Final Office Action for U.S. Appl. No. 13/283,526, filed Oct. 27, 2011, dated Jun. 18, 2013, 67 pgs.

Splitz, David Edwin; Notice of Allowance for U.S. Appl. No. 13/283,526, filed Oct. 27, 2011, dated Oct. 9, 2013, 16 pgs.

Splitz, David Edwin; Non-Final Office Action for U.S. Appl. No. 15/161,448, filed May 23, 2016, dated Sep. 22, 2017, 32 pgs.

Splitz, David Edwin; Issue Notification for U.S. Appl. No. 13/339,655, filed Dec. 29, 2011, dated Sep. 17, 2014, 1 pg.

Splitz, David Edwin; Non-Final Office Action for U.S. Appl. No. 13/339,655, filed Dec. 29, 2011, dated Mar. 5, 2014, 18 pgs.

Splitz, David Edwin; Non-Final Office Action for U.S. Appl. No. 13/339,655, filed Dec. 29, 2011, dated Sep. 16, 2013, 57 pgs.

(56) References Cited

OTHER PUBLICATIONS

Splitz, David Edwin; Notice of Allowance for U.S. Appl. No. 13/339,655, filed Dec. 29, 2011, dated May 23, 2014, 41 pgs.
Splitz, David Edwin; Final Office Action for U.S. Appl. No. 14/490,081, filed Sep. 18, 2014, dated Jan. 11, 2017; 23 pgs.
Dukes, Brent.; Issue Notification for U.S. Appl. No. 14/475,050, filed Sep. 2, 2014, dated Jan. 18, 2017, 1 pg.
Dukes, Brent; Non-Final Office Action for U.S. Appl. No. 14/475,050, filed Sep. 2, 2014, dated May 19, 2016, 119 pgs.
Dukes, Brent; Notice of Allowability for U.S. Appl. No. 14/475,050, filed Sep. 2, 2014, dated Dec. 15, 2016, 6 pgs.
Dukes, Brent; Notice of Allowability for U.S. Appl. No. 14/475,050, filed Sep. 2, 2014, dated Nov. 21, 2016, 33 pgs.
Dukes, Brent; Notice of Allowance for U.S. Appl. No. 14/475,050, filed Sep. 2, 2014, dated Oct. 21, 2016, 15 pgs.
Cullinan, Thomas; Final Office Action for U.S. Appl. No. 15/098,986, filed Apr. 14, 2016, dated Jan. 25, 2018, 22 pgs.
Cullinan, Thomas; Non-Final Office Action for U.S. Appl. No. 15/098,986, filed Apr. 14, 2016; dated Jul. 12, 2017; 23 pgs.
Grady, Robert Henry; Non-Final Office Action for U.S. Appl. No. 15/065,423, filed Mar. 9, 2016, dated Nov. 28, 2017, 45 pgs.
Splitz, David Edwin; Non-Final Office Action for U.S. Appl. No. 14/490,081, filed Sep. 18, 2014; dated Sep. 29, 2016; 34 pgs.
Splitz, David; International Preliminary Report on Patentability for serial No. PCT/US11/58260, filed Oct. 28, 2011, dated May 8, 2014, 7 pgs.
Splitz, David; International Search Report and Written Opinion for serial No. PCT/US11/58260, filed Oct. 28, 2011, dated Feb. 7, 2012, 8 pgs.
Splitz, David Edwin; Office Action for Canadian Patent Application No. 2,861,675, filed Oct. 28, 2011, dated Aug. 22, 2017, 4 pgs.
Splitz, David; International Preliminary Report on Patentability for serial No. PCT/US12/22060, filed Jan. 20, 2012, dated May 8, 2014, 6 pgs.
Splitz, David; International Search Report and Written Opinion for serial No. PCT/US12/22060, filed Jan. 20, 2012, dated Mar. 29, 2012, 8 pgs.
Splitz, David Edwin; Office Action for Canadian patent application No. 2,850,059, filed Mar. 25, 2014, dated Oct. 31, 2017, 3 pgs.
Splitz, David Edwin; U.S. Provisional Patent Application entitled: Automatic Discovery of Nodes in a Mesh Network, U.S. Appl. No. 61/779,896, filed Mar. 13, 2013; 110 pgs.
Dukes, Brent; International Preliminary Report on Patentability for PCT application No. PCT/US15/44140, filed Aug. 7, 2015, dated Mar. 16, 2017, 12 pgs.
Dukes, Brent; International Search Report and Written Opinion for application No. PCT/US15/44140, filed Aug. 7, 2015, dated Dec. 30, 2015, 15 pgs.
Splitz, David Edwin; Extended European Search Report for serial No. 12844451.0, filed Jan. 20, 2012, dated Apr. 21, 2015, 8 pgs.
Splitz, David Edwin; Non-Final Office Action for U.S. Appl. No. 15/206,851, filed Jul. 11, 2016, dated Feb. 7, 2018, 53 pgs.
Splitz, David Edwin; International Search Report for PCT Application No. PCT/US2017/050393, filed Sep. 7, 2017, dated Jan. 8, 2018, 14 pgs.
Godwin, Angela; Article entitled: "Advanced Metering Infrastructure: Drivers and Benefits in the Water Industry", Waterworld, accessed on Mar. 30, 2016, 7 pgs.
TRON; Brochure for ChoiceConnect, Copyright 2013, 4 pgs.
ITRON; Brochure for Radio Frequency Strategy in an AMI Deployment, Copyright 2012, 5 pgs.
Splitz, David Edwin; Issue Notification for U.S. Appl. No. 14/490,081, filed Sep. 19, 2014, dated Jul. 11, 2018, 1 pg.
Grady, Robert Henry; Corrected Notice of Allowance for U.S. Appl. No. 15/065,423, filed Mar. 9, 2016, dated Aug. 9, 2018, 6 pgs.
Grady, Robert Henry; Issue Notification for U.S. Appl. No. 15/065,423, filed Mar. 9, 2016, dated Aug. 21, 2018, 1 pg.
Berg et al., Spread Spectrum in Mobile Communication, 1998, The Institution of Electrical Engineers, ISBN 085296935X, pp. 42-132 (Year: 1998).
Splitz, David Edwin; Final Office Action for U.S. Appl. No. 15/206,851, filed Jul. 11, 2016, dated Jul. 20, 2018, 25 pgs.
Splitz, David Edwin; Response to Amendment under Rule 312 for U.S. Appl. No. 15/161,448, filed May 23, 2016, dated Sep. 11, 2018, 6 pgs.
Splitz, David Edwin; Notice of Allowance for U.S. Appl. No. 15/583,263, filed May 1, 2017, dated Aug. 30, 2018, 13 pgs.
Splitz, David Edwin; Corrected Notice of Allowability for U.S. Appl. No. 14/490,081, filed Sep. 18, 2014, dated Jun. 26, 2018, 8 pgs.
Cullinan, Thomas; Final Office Action for U.S. Appl. No. 15/098,986, filed Apr. 14, 2016, dated Oct. 4, 2018, 27 pgs.
Splitz, David Edwin; Corrected Notice of Allowance for U.S. Appl. No. 15/206,851, filed Jul. 11, 2016, dated Oct. 17, 2018, 13 pgs.
Splitz, David Edwin; Notice of Allowance for U.S. Appl. No. 15/206,851, filed Jul. 11, 2016, dated Sep. 20, 2018, 9 pgs.
Splitz, David Edwin; Issue Notification for U.S. Appl. No. 15/161,448, filed May 23, 2016, dated Sep. 19, 2018, 1 pg.
Cullinan, Thomas; Non-Final Office Action for U.S. Appl. No. 15/098,986, filed Apr. 14, 2016, dated Feb. 26, 2019, 15 pgs.
Splitz, David Edwin; Office Action for Canadian patent application No. 2,850,059, filed Mar. 25, 2014, dated Dec. 13, 2018, 4 pgs.
Splitz, David Edwin; Corrected Notice of Allowance for U.S. Appl. No. 15/206,851, filed Jul. 11, 2016, dated Jan. 4, 2019, 9 pgs.
Splitz, David Edwin; Issue Notification for U.S. Appl. No. 15/206,851, filed Jul. 11, 2016, dated Jan. 16, 2019, 1 pg.
Splitz, David Edwin; Issue Notification for U.S. Appl. No. 15/583,263, filed May 1, 2017, dated Dec. 19, 2018, 1 pg.

* cited by examiner

NODE COMMUNICATION WITH UNKNOWN NETWORK ID

TECHNICAL FIELD

This disclosure relates to networks, and more specifically, to data communications between devices in a network.

BACKGROUND

A utility provider, such as a gas, electricity, or water provider, may have a large number of utility devices that provide control, measuring, and/or sensing capabilities that are installed in the field in order to control transmission and distribution of the product, measure and record product usage, and/or detect problems. Such utility devices may include water, gas, or electrical meters, remotely controlled valves, flow sensors, leak detection devices, among others. Utility devices may include or be connected to wireless communication end-devices (herein also referred to as "nodes") that communicate through wireless communications with other communication devices to provide remote meter reading, for example.

A traditional Advanced Meter Reading (AMR) system allows for only one-way communication between a node and another network device, such as a mobile ("drive-by") collector. The node periodically emits a signal (herein also referred to as an "AMR beacon") containing information identifying the utility device (such as a water meter register identification number) as well as a usage reading determined by the device. The node in a conventional AMR system does not receive any communication from any network device.

AMR networks evolved into Advanced Metering Infrastructure (AMI) networks, which are characterized by two-way communication between a node and another network device or devices. In a typical, fixed AMI configuration, an AMI system may comprise a central host capable of connecting via wired and/or wireless networking infrastructures to a number of communication nodes, each node providing network communications for one or more connected utility devices (including metering devices, control devices, sensor devices, or the like). The AMI system may further include data collection hubs, repeaters, gateways, and the like. Despite the advantages presented by AMI networks over AMR networks (such as robustness), many utility providers continue to use AMR networks because the costs of completely replacing an AMR network with an AMI network are significant.

SUMMARY

Disclosed is a system and method for sending, by a node, a beacon at a regular time interval, the beacon comprising a utility device ID (such as a water meter register ID, for example) and communication channel information; receiving, at the node, after a defined delay, a message from a network device in accordance with the communication channel information; determining, by the node, if the message includes the utility device ID associated with the node; and initiating, by the node, temporary two-way communication by sending a response to the network device.

Another aspect includes a system and method for listening, by a network device, for beacons from a plurality of nodes to locate and communicate with a targeted node, the beacon comprising at least a utility device ID and channel information; and determining, by the network device, that the beacon from the targeted node of the plurality of nodes has been received based on the utility device ID included in the beacon.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

Figure 1:
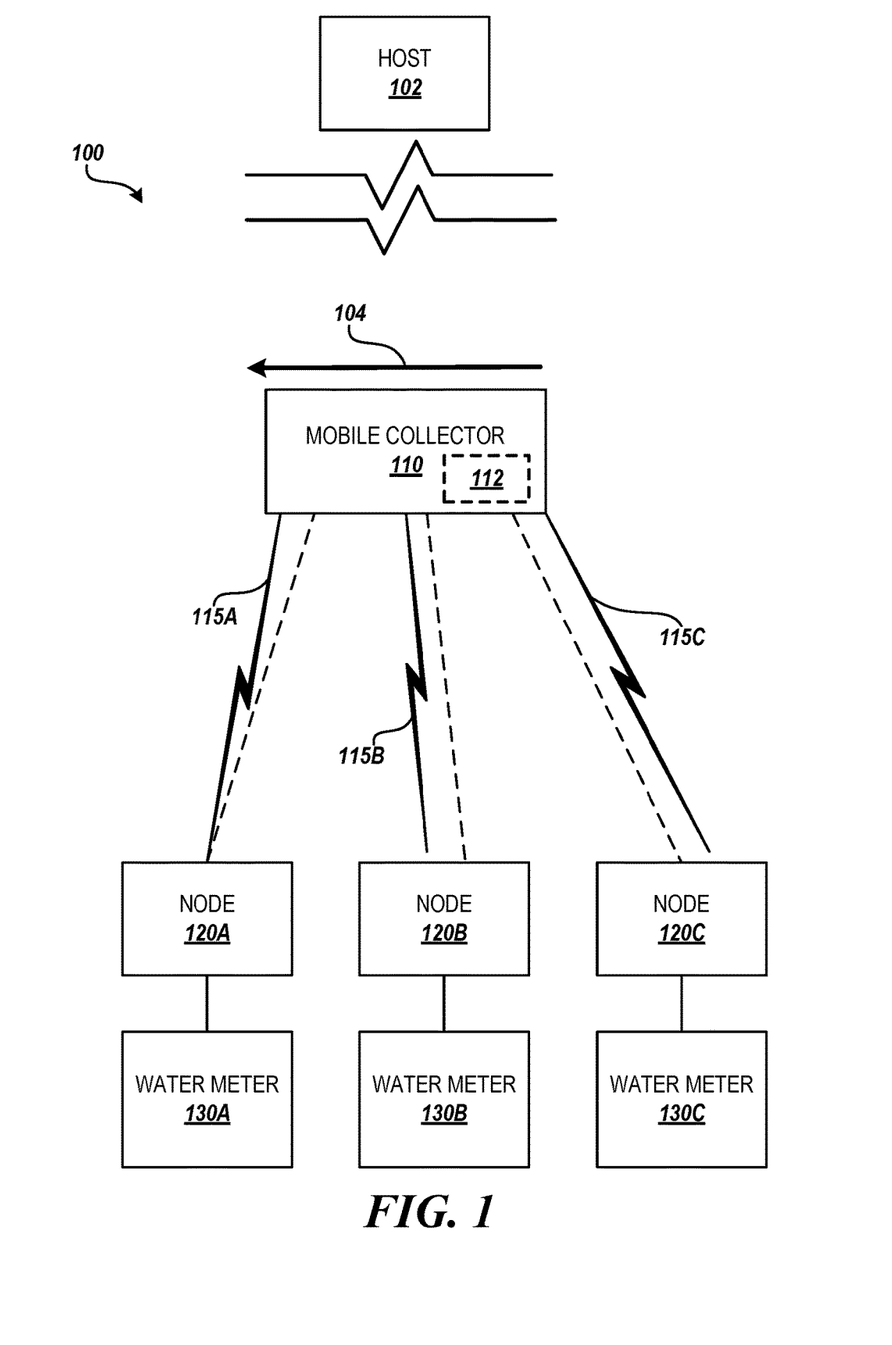
FIG. 1 is a block diagram showing one example of a modified AMR network topology, according to examples of the present disclosure.

FIG. 1 is a block diagram showing one example of a network topology of a portion of an illustrative communication system 100 utilizing a modified AMR, such as that implemented by a utility provider. "Modified" AMR as used herein indicates a difference from conventional AMR networks in that the communication system 100 permits limited two-way communication with a node that not only sends AMR beacons, but that also listens for communications that may come from, in some embodiments, a mobile or stationary collector. Communication system 100 includes a mobile ("drive-by") collector 110 having a transceiver 112 moving in a direction such as shown by arrow 104, the movement provided by a motorized vehicle (not shown) on which the mobile collector 110 may be mounted or carried.

According to various embodiments, the mobile collector 110 passes in sufficient proximity to nodes 120A-C (referred to herein generally as nodes 120) to allow wireless communication between the nodes 120 and the mobile collector 110 through various communication links 115A-C (referred to herein generally as communication links 115). The communication links 115 may include wireless communication links, such as radio frequency ("RF") communication links. The transceiver 112 of the mobile collector 110, together with a transceiver housed in each of the nodes (see FIG. 5), primarily provide for one-way transmissions from the nodes 120 to the mobile collector 110. However, since it is occasionally desirable to communicate with a particular targeted node 120 from a collector, such as to obtain additional data, or send commands to the node 120, such as for a connected utility device, this modified AMR system allows for temporary two-way communication between the mobile collector 110 and the nodes 120. The mobile collector 110 collects usage data, sensor data, and other data from the nodes 120 (including, for example, more detailed usage data from utility devices, represented as water meters 130A, 130B,130C) and provides that data to a host 102. The host 102 is separated from the remainder of the elements of the communication system 100 by broken lines to indicate that the host 102 is housed in a location remote from mobile collector 110 when the mobile collector 110 is in transit collecting the data from the nodes 120. The host 102 may represent a combination of application servers, database servers, communication servers, web servers, and the like that comprise the systems of the utility provider used to collect data from, control, and manage the various communication nodes 120. When the mobile collector 110 completes its collection of data from the nodes 120, the mobile collector 110 is brought into sufficient proximity with the host 102 to permit transfer of collected data to the host 102 via any suitable data connection, such as with cables or wireless devices, or through portable memory storage (not shown). Other embodiments include the mobile collector 110 maintaining cellular or other persistent wireless connections to the host 102 for immediate data communications.

Nodes 120 may be connected to (including being integrated with, in some implementations) utility devices, such as water, gas, or electrical meters, remotely controlled valves, flow sensors, leak detection devices, etc. (represented as water meters 130A,130B,130C). The mobile collector 110 is one example of a network device, and the water meters 130 are examples of utility devices. It will be appreciated that the term "node" as used herein may refer to either a composite device in a network capable of performing a specific function or a communication module connected to such a device and configured to provide communications for the device with the mobile collector 110. Each node 120 periodically transmits an AMR beacon containing a utility device identification number (ID), such as a water meter register ID, as well as utility device information, such as water usage reading data, and, in accordance with the present disclosure, communication channel information, such as an indication of the node's hailing channel pair (different nodes listen to different hailing channels), in accordance with some implementations, among others. For example, when one of the nodes 120 is connected to (including integrated into) a water meter 130, then the AMR beacon includes a water meter register ID, an indication of a node hailing channel pair, and data representative of a reading of the water meter, among other possible data, such as alarm or notification information, for example. According to some embodiments, nodes 120 are able to enter a sleep mode and listen relatively intermittently for a hail from the other device. One way to maximize battery life of a node 120 powered by a battery is to only intermittently "listen" for a hailing communication from another network device, whereby the node 120 is only powered on (i.e., "awake") to detect whether any hail messages are being sent over predefined alternating hailing channels, and if not, to power off (i.e., "sleep") for a predesignated time. This waking-sleeping sequence repeats, with the listening during waking moments called sniffs during sniff windows, and the predetermined delay after the AMR beacon is transmitted known as a sniff delay. Thus, in one embodiment, the sniffing windows begin after a predetermined sniff delay after each AMR beacon is broadcasted. Consequently, sniff windows typically occur at the same rate as AMR beacon transmissions for a particular node 120.

Figure 2:
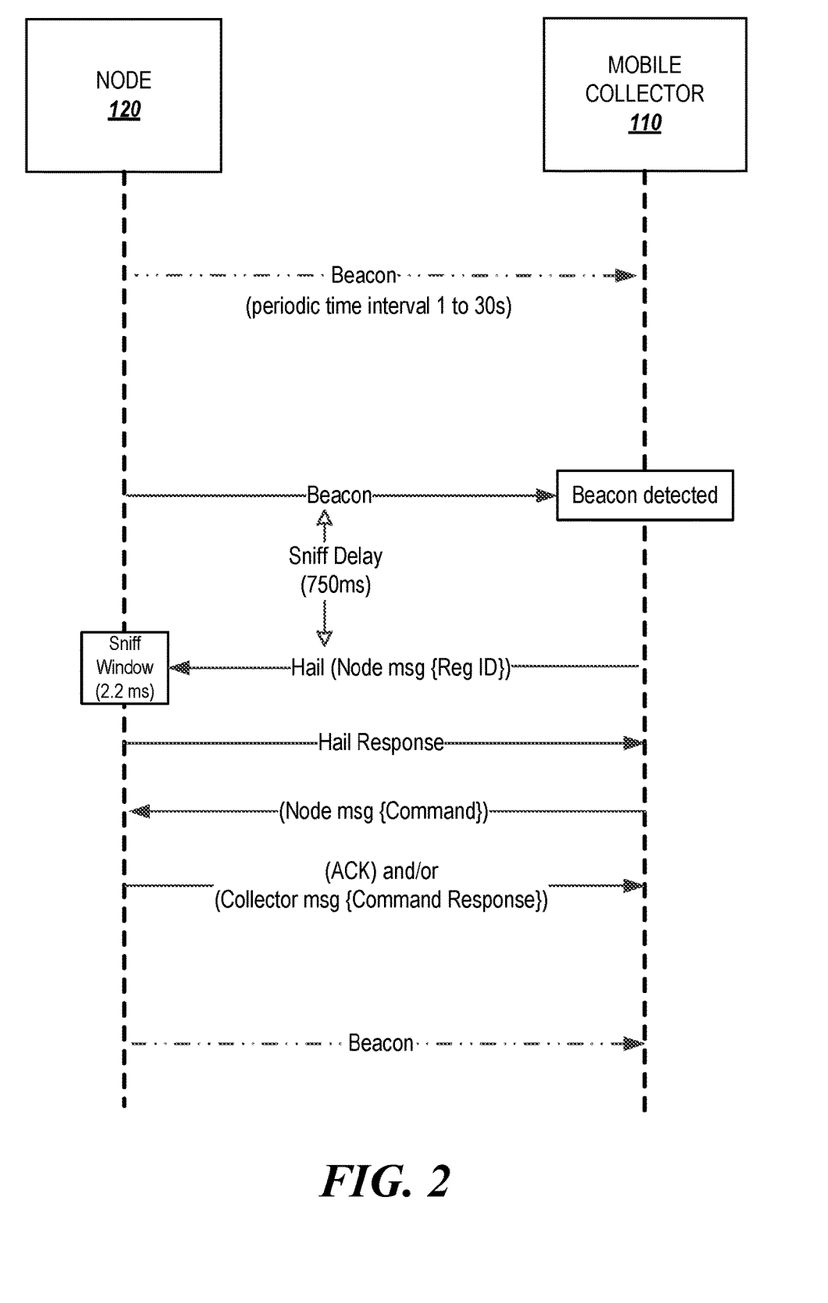
FIG. 2 illustrates a timing diagram of a method for communicating between a node and a mobile collector without knowing a network identification of the node, according to examples of the present disclosure.

FIG. 2 illustrates a timing diagram 200 of a method for communicating between a node and a mobile collector without knowing a network identification of the node, according to some examples of the present disclosure. Example flow chart diagrams of timing diagram 200 is displayed in FIGS. 3 and 4, which illustrate methods 300 and 400, respectively, for communicating with a mobile collector by a node, and communicating with a node by a mobile collector, without knowing a network identification of the node by the mobile collector in a communication system, such as communication system 100 (FIG. 1), according to examples of the present disclosure.

As shown in FIG. 2, an AMR beacon, which includes a register ID of a connected water meter 130 (one example of a utility device ID), a water usage reading from the register of the water meter 130 (one example of utility device reporting data), and an indication of the node's hailing channel pair (one example, among others, of communication channel information), is periodically sent out by the node 120 at a regular time interval. Some examples of a regular time interval are in the range of 1 to 30 seconds, and in one particular example, the regular time interval is six seconds. The mobile collector 110, as a network device, will monitor for AMR beacons from a plurality of nodes (i.e., nodes 120). When the mobile collector 110 detects an AMR beacon, it parses the beacon data to determine if it contains a register ID that is designated (or targeted) for additional communications. For example, the mobile collector 110 can be programmed before it is carried on a mobile route to have a list of register IDs for which additional communication is designated, as well as (in some embodiments) an identification of the type of additional communication that is desired, e.g., requesting additional data to be supplied from a water meter or commanding certain actions to take place, such as turning off an associated water valve.

For each reception and determination of a register ID for which additional communications are designated, a hail message including the register ID is created and transmitted from the mobile collector 110 on the alternating hailing channels identified in the AMR beacon after a predefined delay after the AMR beacon was transmitted from the node 120 since that is when the node 120 will be listening during a predefined time window to detect a hail message. In addition, if the mobile collector 110 receives the AMR beacon from a particular node 120, the mobile collector 110 knows it is in range to be able to hail a particular node 120. This predefined delay is shown as a sniff delay, and the predefined time window is shown as a sniff window. According to an example embodiment, the sniff delay may be 750 milliseconds (ms), and the sniff window may be 2.2 ms, after the sniff delay. After the node 120 sniffs to determine that a possible hail message is being received, the node 120 enters a receive mode to receive the hail message, which the node 120 analyzes to determine if the message contains a register ID associated with the node 120. Sniffing takes less power than the receive mode. If the node 120 determines that a hail message with an associated register ID is received, the node 120 responds with a hail response, preferably on a data channel known to the mobile collector 110 and the node 120. Such a data channel can be predetermined or communicated as part of the hail message. The mobile collector 110 then sends the node 120 a command message. According to some embodiments, the command message may be a Network System Status Request (NSSR), a log request such as a single reading or a series of readings over a predetermined time period, or may be instructions to operate a disconnect valve to turn off/on the water meter 130 connected to the node 120. The node 120 may then send an acknowledge (ACK) message in response, or may send a command response including the requested data (if required).

Figure 3:
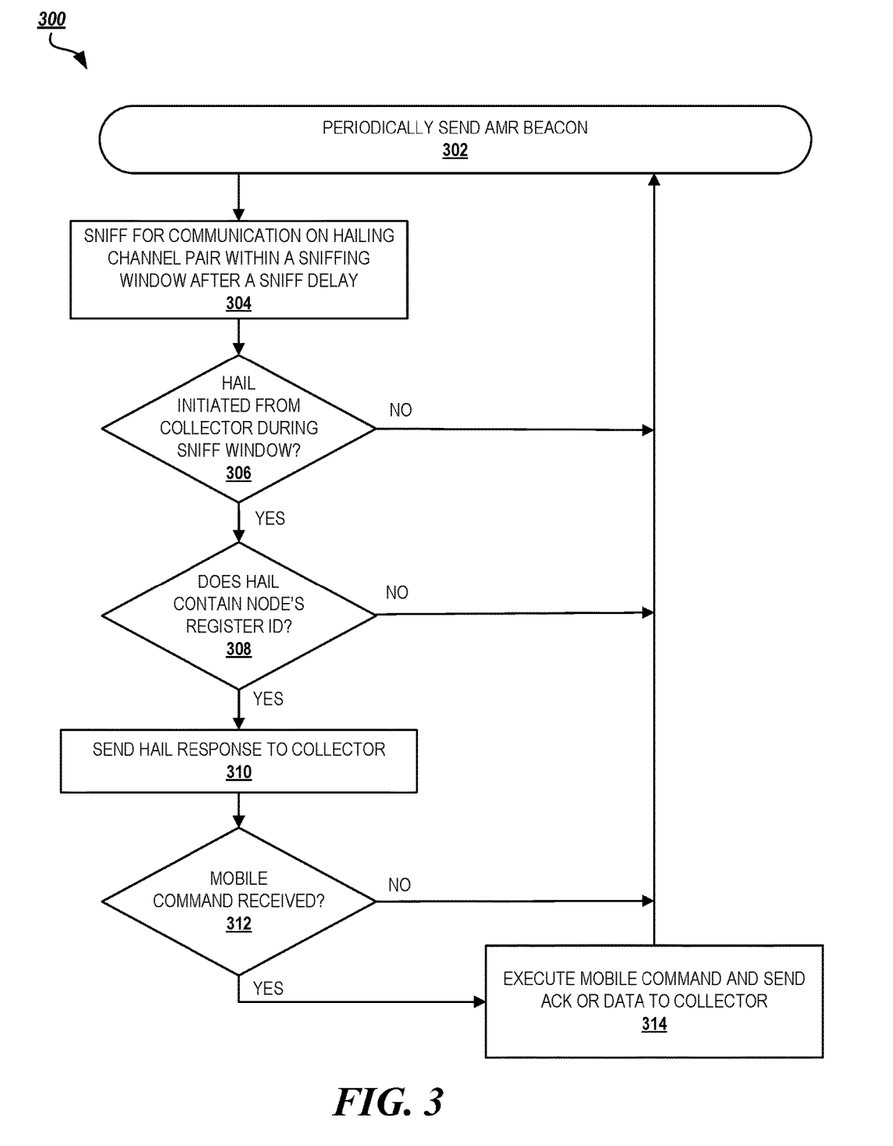
FIG. 3 illustrates a flow chart diagram of a method for communicating with a mobile collector by a node without knowing a network identification of the node by the mobile collector, according to examples of the present disclosure.

FIG. 3 illustrates a flow diagram of an exemplary method 300 for communicating with a mobile collector 110 by a node 120 without knowing a network ID of the node by the mobile collector in a communication system, such as communication system 100 (FIG. 1), according to examples of the present disclosure. Method 300 focuses on operations executed by nodes 120 and begins at block 302, where the node 120 periodically sends an AMR beacon at a regular time interval. Next, at block 304, the node 120 will listen, or sniff, for communications on, preferably, a hailing channel pair within a sniff window following a delay after the AMR beacon was sent, known as a sniff delay. Next, at decision block 306, the node 120 determines if a hail message is received from a network device, such as mobile collector 110, that began within the sniff window. If no hail is received that began within the sniff window, method 300 returns to block 302, and after a regular time interval has elapsed from the previous AMR beacon, the node 120 sends another AMR beacon. If such a hail is received from a network device, such as mobile collector 110, next, at decision block 308, the node 120 determines if the hail message contains a register ID associated with the node 120. In one implementation, the hail message is a broadcast hail message that is therefore addressed to a broadcast node ID as a destination ID so that every node 120 within range initially evaluates the hail message as possibly directed to it in order to then determine whether the register ID is contained in the hail message. If the node 120 does not identify such a register ID in the hail message, then the node 120 ignores the hail message, and method 300 returns to block 302. If the node 120 does identify an associated register ID in the hail message, then next, at block 310, the node 120 sends a hail response to the mobile collector 110.

Next, at decision block 312, the node 120 determines if a mobile command message was received from the mobile collector 110. A mobile command message could include command instructions requesting additional usage data, for opening or closing of a disconnect valve, performing a controlled flush, another function of the water meter, or the like. If a mobile command is received, at block 314, the node 120 executes the mobile command, and sends an ACK or the requested data to the collector 110. Following block 314, or if a mobile command was not received at decision block 312, then the method 300 returns to block 302. According to an exemplary embodiment, the node 120 will continue the sleep-awaken cycle and periodically send the AMR beacon until a hail message is received during the sniff window after each beacon is sent.

Figure 4:
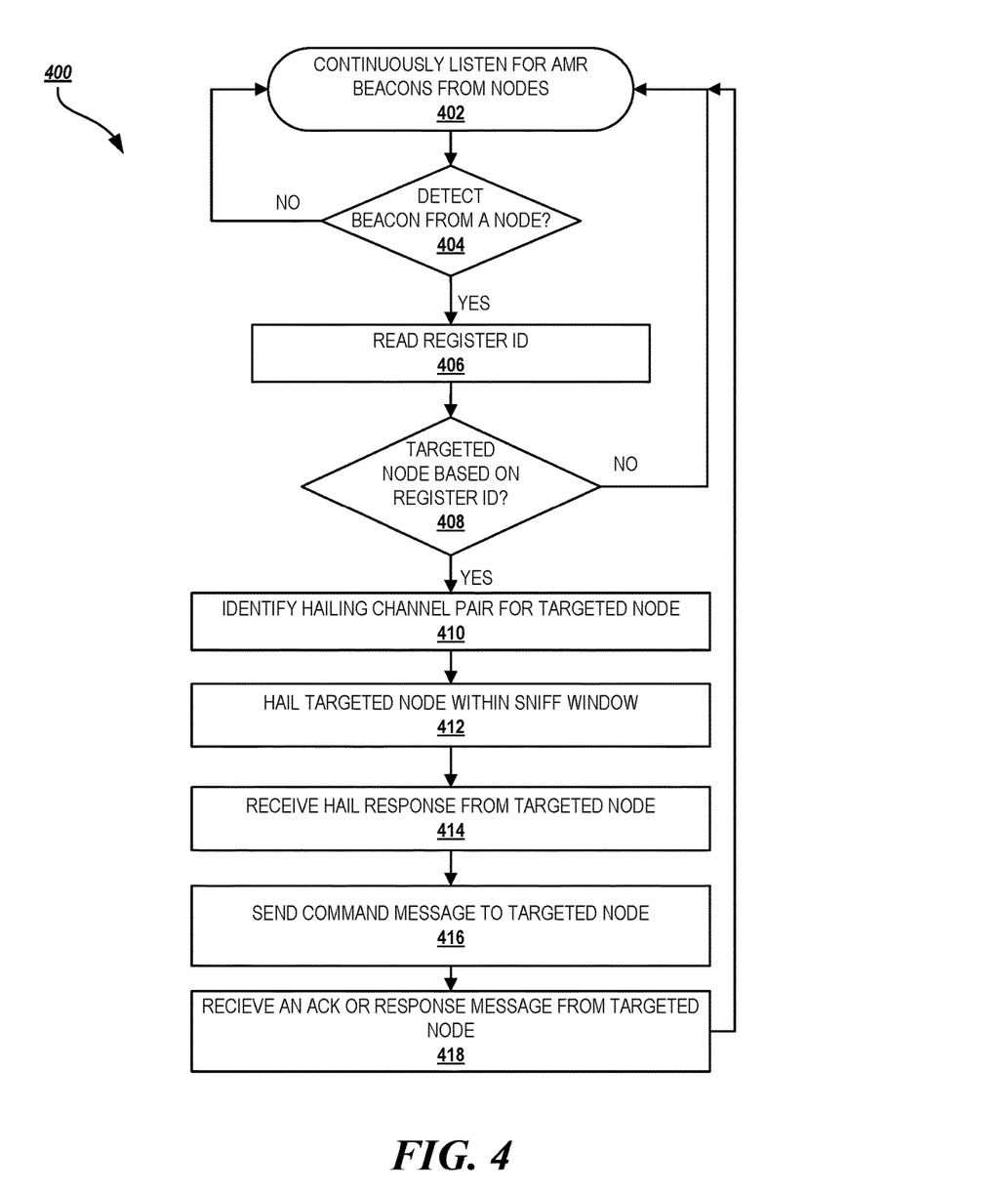
FIG. 4 illustrates a flow chart diagram of a method for communicating with a node by a mobile collector without knowing a network identification of the node by the mobile collector, according to examples of the present disclosure.

FIG. 4 illustrates a flow diagram of an exemplary method 400 for communicating with a node 120 by a mobile collector 110 without knowing a network ID of the node 120, according to examples of the present disclosure, among others. Method 400 focuses on operations executed by the mobile collector 110 and operationally begins at block 402, where the mobile collector 110 continuously listens for AMR beacons sent from nodes 120 in order to receive usage information and deliver command messages to particular (targeted) nodes 120. Next, at decision block 404, the mobile collector 110 determines if an AMR beacon is detected from a node 120. If a beacon is not detected, then the mobile collector 110 continuously listens for AMR beacons at block 402.

Once a beacon is detected (and stored) by the mobile collector 110, then at block 406, the mobile collector 110 reads (parses) the register ID from the AMR beacon of node 120. Next, at decision block 408, the mobile collector 110 determines if the node 120 is a targeted node based on the register ID. In one embodiment, prior to initiation of the method 400, a list of targeted register IDs is stored in the mobile collector 110 for a comparison process at block 408, which may include a table look-up process. Associated commands for each register ID may also be stored in the mobile collector 110 for implementations able to process multiple types of commands, though some implementations may only simply send one type of command, e.g., requesting logged usage data stored in the targeted node. If the node 120 is not the intended node based on the register ID, then the mobile collector 110 returns to continuously listen for AMR beacons at block 402. If the register ID sent by a node 120 confirms the node 120 as a targeted node, then method 400 proceeds to block 410, and the mobile collector 110 determines (reads/parses) the hailing channel pair of the intended node 120 from the AMR beacon. In one example, 4 bits are used to identify 16 possible hailing channel pairs. Next, at block 412, the mobile collector 110 hails the intended node 120 on the hailing channel pair within the sniff window, the timing for which is calculated from the time the AMR beacon was sent from the node 120, as discussed above. The mobile collector 110 then, at block 414, listens to receive a hail response message from the targeted node 120, preferably on a predetermined or communicated data channel, though other predefined channels or communication protocols could be used in other implementations. Next, at block 416, the mobile collector 110 sends a command message to the intended node 120 on a data channel (or other communication channel in other implementations). The mobile collector 110 then waits and receives either an ACK message that a mobile command was received and/or performed, or the mobile collector 110 receives a response message (e.g., data/log communication) from the targeted node 120 at block 418. Method 400 then continues at block 402.

Other implementations not disclosed herein for FIGS. 3-4, may include other methods of determining if a hailing message is valid for the node 120, including other implementations of directed hailing messages as well as broadcast messages that are not directed to any particular node 120. For example, some implementations may utilize frequency hopping techniques. If, for example, the receiving node 120 detects its node ID in the hail message, then the receiving node 120 may hop from the hailing channel, on which it received the hail message, to one of a variety of data channels identified in, or identifiable from, the hail message, and continue hopping as two-way communications continue. The receiving node 120 may send an ACK signal to the hailing device over the data channel to which the node 120 hopped. It may be determined whether stable two-way (frequency-hopping spread spectrum (FHSS)) communication has now begun with the hailing device (i.e., a valid message, such as a command, has been received from the hailing device) or if an additional hail from the hailing device is needed, such as if the hailing device failed to receive the ACK signal. If it is determined that an additional hail is needed, the receiving node 120 once again listens for a hail message on a hailing channel, and the method repeats. That repeated attempt will again involve checking both hailing channels. If, however, it is determined that no additional hail is needed, then the receiving node 120 begins analyzing any additional data received from the hailing device, since by this point a successful hail has been acknowledged. An additional communication from the hailing device is needed for the node 120 to take an action. Once the receiving node 120 finishes analyzing the data, or message, received on the FHSS channel, it is determined whether the receiving node 120 received a mobile command from a mobile collector 110, i.e., in this case a mobile collector 110 was the hailing device. If so, the node 120 executes the mobile command, which may include instructions for the node 120 to, for instance, perform an action, such as to shut off a valve with which the node 120 may be associated.

According to some embodiments, a reply communication from the node 120 to the mobile collector 110 is, in one aspect of the present disclosure, sent at a power of about 15 dBm, and at a frequency of about 915 MHz. The instructions could also instruct the node 120 to both perform a task and send a communication. The register ID communication from the node 120 is, in one aspect of the present disclosure, sent at a power of about 20 dBm, and at a frequency of about 915 MHz. Additional processes also may be included, and it should be understood that the processes depicted in FIGS. 3-4 represent illustrations, and that other processes may be added or existing processes may be removed, modified, or rearranged without departing from the scope and spirit of the present disclosure. In other implementations there may only be one hailing channel and in still other implementations, there may be more than 2 hailing channels, in which case the alternating would simply rotate through all hailing channels successively. In some examples, nodes 120 may utilize an RF chipset which may include an integrated or connected channel activity detector (CAD). The CAD can quickly assess whether any RF energy exists in a channel that matches a preamble transmission profile. A preamble represents a sequence of symbols that may be repeated at the start of a data message, including a hailing message. A preamble may precede any valid messages, including hailing messages. The preamble can be detected and decoded, enabling, for example, a receiving node 120 to distinguish between a valid, intended message and other data (e.g., noise, data intended for other devices, data from another network, etc.). In an example, the preamble may represent a known sequence of symbols that may be, for example, six (6) symbols, although other numbers of symbols are also possible and may be utilized in various implementations.

Figure 5:
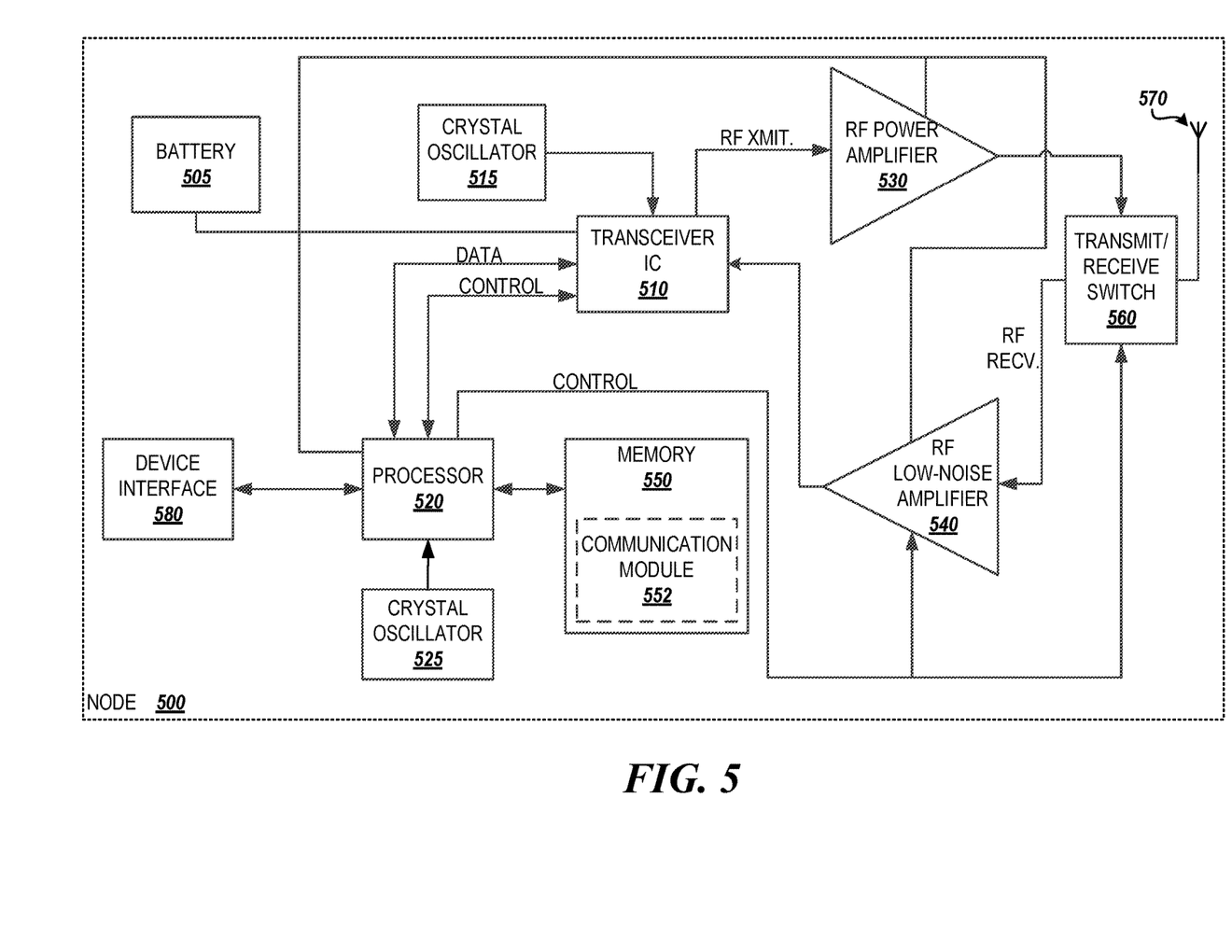
FIG. 5 illustrates a block diagram of a node, according to examples of the present disclosure.

FIG. 5 shows a block diagram of components of an illustrative node 120 configured for RF communication in AMR and temporary AMI mode networks, as discussed herein. In other words, the node 120 is able to operate in an AMR mode or in a modified AMR mode for temporary two-way communication. The node 120 communicates data to and from (and can be integrated with) utility devices in the communication system 100, such as water, gas, or electrical meters, remotely controlled valves, flow sensors, leak detection devices, and the like, and provides communication with wireless AMR network devices, such as mobile collectors 110. For example, the node 120 may be implemented in or connected to water meters (as in FIG. 1) or to a leak detection device in order to transmit audio recording data to the host 102 for leak detection. According to various embodiments, the node 120 may be configured for communication on various radio network topologies, including star, hybrid-star, peer-to-peer, mesh, and the like.

The node 120 may include a battery 505 that powers a transceiver integrated circuit (IC) 510, a processor 520, an RF power amplifier 530, an RF low-noise amplifier 540, a memory 550, and other components. Crystal oscillators 515 and 525 are connected to the transceiver IC 510 and the processor 520, respectively. The node 120 further includes a transmit/receive switch 560 and antenna 570. The processor 520 may be a microprocessor, a microcontroller, a field-programmable gate array (FPGA), or the like. The processor 520 and the transceiver IC 510 may include both a two-way data and a two-way control line. In some embodiments, the processor 520 includes a control line to each of the RF low-noise amplifier 540 and the transmit/receive switch 560. The processor 520 may also be connected to the memory 550 by a two-way data line.

The memory 550 may comprise a processor-readable storage medium for storing processor-executable instructions, data structures and other information. The memory 550 may include a non-volatile memory, such as read-only memory (ROM) and/or FLASH memory, and a random-access memory (RAM), such as dynamic random access memory (DRAM) or synchronous dynamic random access memory (SDRAM). The memory 550 may store firmware that comprises commands and data necessary for the nodes 120 to communicate with other devices in the AMR system 100 as well as perform other operations of the nodes. According to some embodiments, the memory 550 may store a communication module 552 comprising processor-executable instructions that, when executed by the processor 520, perform at least portions of the method 300 for controlling AMR beacons and migrating the node 120 from an AMR mode to a temporary AMI mode for two-way communication with a sending device.

In addition to the memory 550, the node 120 may have access to other processor-readable media storing program modules, data structures, and other data described herein for accomplishing the described functions. It will be appreciated by those skilled in the art that processor-readable media can be any available media that may be accessed by the processor 520 or other computing system, including processor-readable storage media and communications media. Processor-readable storage media includes volatile and non-volatile, removable and non-removable storage media implemented in any method or technology for the non-transitory storage of information. For example, processor-readable storage media includes, but is not limited to, RAM, ROM, erasable programmable ROM (EPROM), electrically-erasable programmable ROM (EEPROM), FLASH memory or other solid-state memory technology.

According to some embodiments, the processor 520 may be further connected to other components of the node 120 through a device interface 580. In some embodiments, the device interface 580 may connect to a metering component, such as a water, gas, or electricity meter, that allows the meter to provide usage data to the host 102 through the communication system 100. In further embodiments, the device interface 580 may connect to sensors or detection components. In still further embodiments, the device interface 580 may connect to a control component, such as an electronically actuated water valve, that allows the host 102 and/or other devices in the communication system 100 to control aspects of the utility provider's infrastructure. These examples are not meant to be limiting, and those of skill in the art will recognize that alternative device components that may be interfaced with the node 120 through the device interface 580. For example, the device interface 580 may connect to a control component (valve actuator) and a data reading port (water meter readings) at the same time.

It will be appreciated that the structure and/or functionality of the node 120 may be different than that illustrated in FIG. 5 and described herein. For example, the transceiver IC 510, processor 520, RF power amplifier 530, RF low-noise amplifier 540, memory 550, crystal oscillators 515, 525, device interface 580 and other components and circuitry of the node 120 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 120 may not include all of the components shown in FIG. 5, may include other components that are not explicitly shown in FIG. 5 or may utilize an architecture completely different than that shown in FIG. 5.

It should also be understood that mobile collector 110 may be implemented in hardware and software in a manner similar to that of node 120, with the understandable programming and hardware differences required to be in accordance with the processes discussed above with respect to FIG. 4. In addition, the power for the mobile collector 110 may be provided by a vehicle, and additional antenna, amplification, and device interface modifications for vehicular use may be included.

Embodiments of the methods and systems are described above with reference to block diagrams and flowchart illustrations of methods, systems, and apparatuses. It will be understood that each block of the block diagrams and flowchart illustrations, and combinations of blocks in the block diagrams and flowchart illustrations, respectively, can be implemented by program instructions. These program instructions may be programmed into programmable processing elements to produce logic that executes on the processing elements to create means for implementing the functions specified in the flowchart block or blocks, which describe and reference specific algorithms and inherent structure for accomplishing the functions as described and further explained herein. These program instructions may also be stored in a processor-readable memory that can direct a processing apparatus to function in a particular manner, such that the instructions stored in the processor-readable memory produce an article of manufacture including processor-readable instructions for implementing the function specified in the flowchart block or blocks. The program instructions may also be loaded onto a processing apparatus to cause a series of operational steps to be performed on the programmable apparatus to produce a processor-implemented process such that the instructions that execute on the programmable apparatus provide steps for implementing the functions specified in the flowchart block or blocks. Accordingly, blocks of the block diagrams and flowchart illustrations support combinations of elements for performing the specified functions, combinations of steps for performing the specified functions and program instructions for performing the specified functions.

Moreover, the above description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the above description is provided as illustrative of the principles of the present disclosure and not in limitation thereof. In addition, as used throughout, the singular forms "a," "an" and "the" include plural referents unless the context clearly dictates otherwise. Thus, for example, reference to "a panel" can include two or more such panels unless the context indicates otherwise. Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances. As used herein, the terms "optional" or "optionally" mean that the subsequently described event or circumstance may or may not occur, and that the description comprises instances where said event or circumstance occurs and instances where it does not. It is further understood that the disclosure is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described disclosure, nor the claims which follow.

That which is claimed is:

1. A method comprising steps of:
   sending, by a node, a beacon at a regular time interval, the beacon comprising an associated utility device identification number (ID) and communication channel information;
   receiving, at the node, a message from a network device on the communication channel that is beginning within a time window after a predefined delay after the beacon was sent;
   determining, by the node, whether the message comprises the utility device ID; and
   initiating, by the node, temporary two-way communication by sending a response to the network device responsive to determining the message comprises the utility device ID.

2. The method of claim 1, wherein the beacon is an advanced meter reading (AMR) beacon, wherein the utility device ID is a water meter register ID, wherein the communication channel information includes hailing channel information, and wherein the response is sent on a data channel that is different from a hailing channel.

3. The method of claim 1, wherein the determining step includes initially evaluating whether the message is directed to a broadcast network address prior to determining if the message comprises the utility device ID.

4. The method of claim 1, further comprising:
determining, by the node, if a mobile command is received from the network device; and
subsequent to a determination the mobile command is received, executing, by the node, the mobile command.

5. The method of claim 4, wherein the mobile command comprises a disconnect valve command.

6. The method of claim 1, further comprising:
determining, by the node, if a data request is received from the network device; and
responsive to a determination the data request is received, sending, by the node, a data communication.

7. The method of claim 6, wherein the data communication comprises a log of stored data by the node for a predetermined time period.

8. A node, comprising:
a processor; and
logic processed by the processor to
send a beacon at a regular time interval, the beacon comprising a utility device identification (ID) and communication channel information;
receive a message from a network device on the communication channel beginning within a time window after a predefined delay after the beacon was sent;
determine if the message comprises the utility device ID; and
initiate temporary two-way communication by sending a response to the network device.

9. The node of claim 8, wherein the beacon is an advanced meter reading (AMR) beacon, wherein the utility device ID is a water meter register ID, wherein the communication channel information includes hailing channel information, and wherein the response is sent on a data channel distinct from a hailing channel.

10. The node of claim 8, wherein the logic to determine if the message comprises the utility device ID includes logic to initially evaluate whether the message is directed to a broadcast network address prior to determining if the message comprises the utility device ID.

11. The node of claim 8, wherein the logic is further processed by the processor to:
determine if a mobile command is received from the network device; and
subsequent to a determination the mobile command is received, execute the mobile command.

12. The node of claim 11, wherein the mobile command comprises a disconnect valve command.

13. The node of claim 8, wherein the logic is further processed by the processor to:
determine if a data request is received from the network device; and
subsequent to a determination the data request is received, send a data communication.

14. The node of claim 13, wherein the data communication comprises a log of stored data by the node for a predetermined time period.

* * * * *